Dec. 30, 1930.  G. W. LAUTRUP  1,787,044
MOTOR OPERATED BRAKE
Filed Oct. 11, 1927
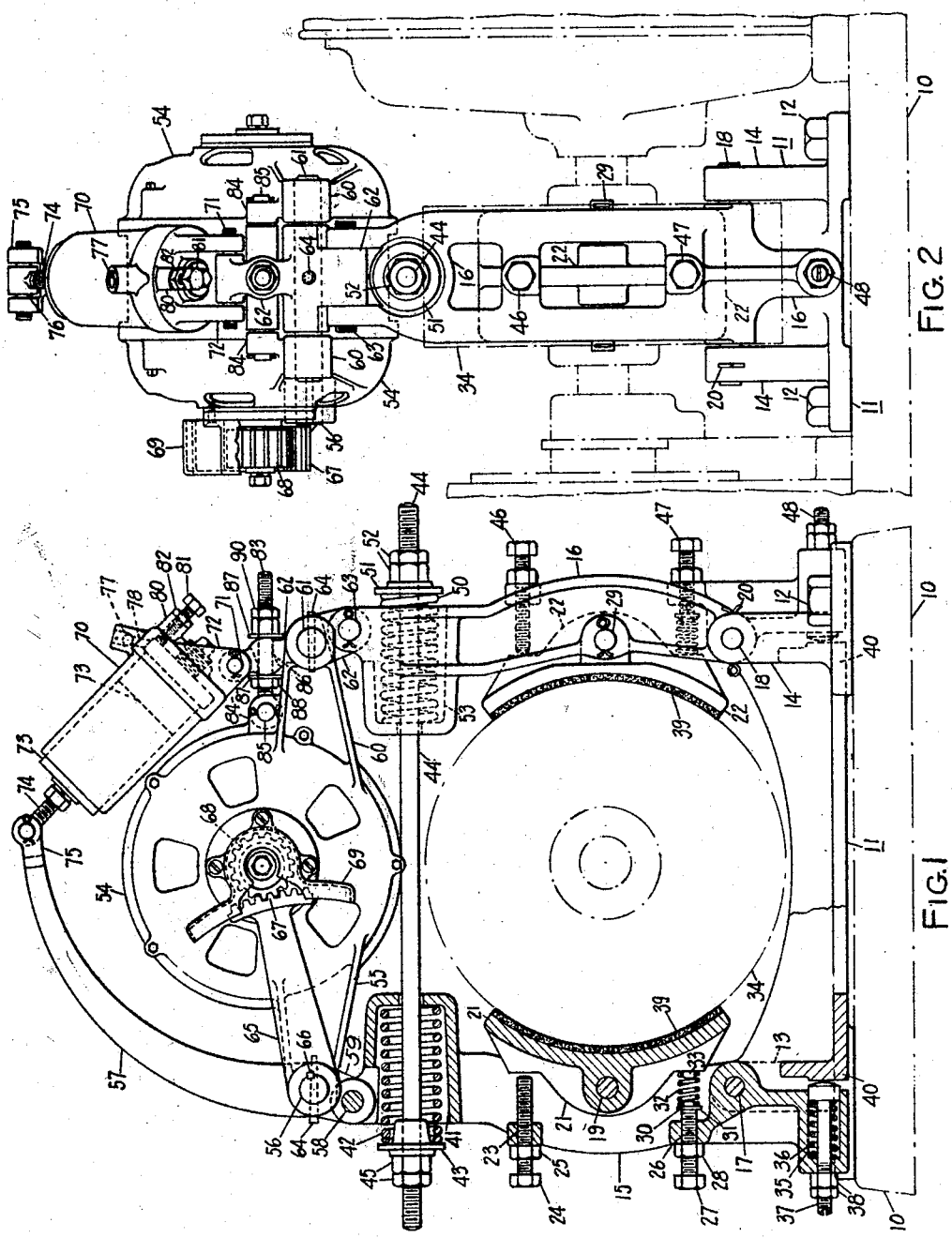
George W. Lautrup INVENTOR
BY Walter E. Bradley ATTORNEY Patented Dec. 30, 1930

1,787,044

UNITED STATES PATENT OFFICE

GEORGE W. LAUTRUP, OF YONKERS, NEW YORK, ASSIGNOR TO OTIS ELEVATOR COMPANY, OF NEW YORK, N. Y., A CORPORATION OF NEW JERSEY

MOTOR-OPERATED BRAKE

Application filed October 11, 1927. Serial No. 225,508.

This invention relates to mechanism of the type wherein friction shoes are caused to engage a rotatable drum and particularly to multiple shoe braking mechanism for elevator hoisting machines wherein the brake shoes are mechanically applied and electrically released.

One feature of the invention is the provision of braking mechanism in which the force exerted to move one shoe with respect to the drum is counterbalanced by the force exerted to move another shoe with respect to the drum both in the releasing and applying operations.

A second feature of the invention is the provision of braking mechanism in which the operation of the brake shoes is caused by a rotative device, for example a motor, the device being supported by the brake arms.

A third feature is the provision of retarding mechanism which can not interfere with the proper application of the brake shoes.

A fourth feature is the provision of braking mechanism which is of simple construction, quiet in operation and readily adjustable.

A fifth feature is the provision of braking mechanism in which the proper release and application of the brake shoes is assured under all conditions of operation.

A sixth feature is the provision of braking mechanism in which both the brake releasing and retarding mechanisms are removable as a unit, or in which the retarding mechanism is separately removable for purposes of repair or replacement.

Other features and advantages will become apparent from the following description and appended claims.

In the drawing:

Figure 1 is a side elevation of a brake, with portions shown in section to illustrate certain structural details; and Figure 2 is a front elevation of the same.

Referring to the drawing, a base 10 has fastened thereto a frame 11 by means of bolts 12. The frame 11 has pedestals 13 and 14 formed theron, upon which are pivotally supported the brake arms 15 and 16, by means of the pins 17 and 18. The pins 17 and 18 are securely held against rotation by cotter pins 20. The brake arms 15 and 16 pivotally support the brake shoes 21 and 22 by means of the pins 19 and 29. The brake shoes are provided with linings 39.

The brake arm 15 has formed therein a threaded aperture 23 through which extends a regulating screw 24. A lock nut 25 serves to lock the screw 24 in position. The brake arm 15 also has formed therein a second threaded aperture 26 through which extends an adjusting screw 27, which may be locked in position by a lock nut 28. The end of the screw 27 is provided with a reduced portion 30 upon which is placed a spring abutment 31. A compression spring 32 is placed between the abutment 31 and the brake shoe 21, the spring being guided and held in place by a lug 33, formed upon the brake shoe, and the reduced portion 30 of the screw 27. By turning the screw 27 the compression of the spring 32 may be varied, thus varying the force acting against the weight of the shoe 21 when the shoe is released. The screw 24 is so adjusted that the shoe may not be forced by the spring in a counter-clockwise direction to such an extent as to cause undue pressure between the drum surface 34 and the lower portion of the shoe when the shoe is released.

The lower portion of the brake arm 15 is formed with a recess 35. A headed stop pin 37 is placed within the recess 35 and has its end extending through an aperture provided in the closed end of the recess. A compression spring 36 surrounds the pin 37, one end of which abuts against the closed end of the recess, the other end abutting against the head of the stop pin 37. The position of the stop pin 37 within the recess 35 is adjusted by means of nuts 38. The head of the stop pin 37 is arranged to engage a stop 40 formed on the frame 11. The upper portion of the brake arm 15 is provided with a recess 41.

The construction of the brake arm 16 is identical with that of the arm 15; it carries the brake shoe 22, the adjusting screws 46 and 47, the stop pin 48, and is provided with a recess 53. A rod 44 extends freely through apertures formed in the closed ends of each of the recesses 41 and 53. Spring stops 43 and 51 are placed upon the ends of the rod, the stops being held in position by the nuts 45 and 52. An actuating spring 42 is placed within the recess 41 between the spring stop 43 and the closed end of the recess. A similar spring 50 is placed within the recess 53 between the spring stop 51 and the closed end of the recess. These springs serve to apply the brake shoes to the drum. The compression of the springs and therefore the force with which the shoes are applied to the drum is varied by adjusting the nuts 45 and 52 upon the rod 44.

A brake releasing motor 54 is supported by the brake arms 15 and 16. This motor may be either an alternating current or a direct current motor.

Each of two motor supporting arms 55 is provided at its end with an aperture, and through these two apertures, which are in alinement, extends a shaft 56. These apertures are of such size that the shaft 56 is free to rotate therein relative to the arms 55. There is rigidly secured to the shaft 56, as by the tapered pin 64, a member 59. One end of the member 59 is pivotally connected at 58 with the brake arm 15, the other end of the member 59, which may be designated as extension 57, serves as a part of the retarding mechanism described later. Also rigidly secured to the shaft 56, as by a key 66, is an operating arm 65 which carries at its end an arcuate rack 67. The arcuate rack 67 meshes with a pinion 68 carried by the motor shaft. Over the rack and pinion is mounted a guard 69.

The member 59 and the operating arm 65 constitute, in effect, a lever fulcrumed in the apertures of motor supporting arms 55, which in turn, are secured to the motor frame. The member 59 and the operating arm 65 may be integrally formed with the extension 57 fastened to the member 59 by keying both the member 59 and the extension 57 to the shaft 56, or the entire three parts, i. e., the member 59, the operating arm 65, and the extension 57, may be made in one piece and mounted upon the shaft 56. The operation in any of these cases is exactly the same.

The motor 54 is also provided with two other supporting arms, designated 60. The two arms 60 are pivotally connected by means of a pin 61 to an adjusting lever 62, which in turn is pivotally connected at 63 to the brake arm 16.

The extension 57 and the lever 62 serve as part of the retarding mechanism. This mechanism includes a dash-pot the cylinder 70 of which is provided with projecting arms 72 pivotally connected at 71 with the lever 62. The piston 73 of the dash-pot has a threaded connection with the piston rod 74 which serves to pivotally connect the piston with the extension 57, the forked end 75 of the extension 57 accommodating the head 76 of the rod 74. The extension 57 is constructed with a comparatively large leverage above the shaft 56, thus securing an appreciable movement of the piston 73 for the very small movement of the pin 58. The piston 73 freely slides in and out the upper end of the cylinder. A ball check valve 77 is provided in the bottom of the cylinder; a passage 78 connects the valve seat with the cylinder. Projecting from the bottom of the cylinder is a hollow boss 80, interiorly threaded; a longitudinally slotted screw 81 is fitted within the boss 80 for regulating the flow of air into the cylinder 70. A lock nut 82 is provided to securely hold the screw 81 in position. As a reduced pressure must first be established in the cylinder before there will be any flow of air into the cylinder, the retarding force of the dash-pot will increase upon movement of the piston.

An adjusting rod 83 is pivoted to the lugs 84 of the motor frame by means of the pin 85. A slot 86 is provided in the lever 62 to accommodate the adjusting rod 83. Upon each side of the rod 83 the collars 87 are placed and are firmly held against the lever 62 by the nuts 88 and 90.

In operation, the motor 54, upon energization, causes the pinion 68 to rotate in a counter-clockwise direction, as viewed in Figure 1. This moves the actuating arm 65, the shaft 56 and the member 59 in a clockwise direction. This movement of the member 59 rotatively in the apertures of the arms 55 as a fulcrum moves the pin 58, and consequently the brake arm 15, away from the drum 34 against the action of the spring. At the same time motion is transmitted to the pin 61, and consequently to the brake arm 16, through the motor casing and the arms 60, since the force tending to move the arm 15 away from the drum is exactly equal to the force tending to move the motor as a whole towards the right, as viewed in Figure 1. Since the springs 42 and 50 are of the same strength, the arms 15 and 16 normally separate simultaneously. As long as the motor remains energized, the braking mechanism is maintained in released position.

In the event that one of the arms 15 or 16 moves before the other, because of dirt or friction, one of the stops 37 or 48 engages the corresponding abutment 40 and the full force of the motor is then available to move the other arm to brake released position.

Upon deenergization of the motor 54, the heavy springs 42 and 50 immediately apply the brake shoes to the drum, the springs acting against the stops 43 and 51 and the inner ends of the recesses 41 and 53. The motor is rotated by the rack and pinion in a clockwise direction, as viewed in Figure 1.

The retarding effect of the dash-pot may be varied to suit the requirements of any particular installation by adjusting the screw 81.

By turning the screw so as to cause it to move downwardly in its threaded passage, the retardation is increased. Conversely, by turning the screw outwardly, the retardation is decreased.

With the brake applied, the desired position of the rack relative to the pinion may be secured by rotating the lever 62 about 63 as a fulcrum. This may be accomplished by changing the position of the nuts 88 and 90 upon the rod 83. This rotation of the lever 62 moves the pin 61, and consequently the motor, relative to the pin 63. The shaft 56 is consequently moved laterally, and is caused to rotate as the pin 58 remains stationary. This rotary motion of the shaft 56 moves the rack relative to the pinion.

With the brake released, the clearance between the brake shoes and the drum may be varied by moving the stop pins 37 and 48 in or out of their recesses.

The desired limits of the piston stroke in and out of the dash-pot cylinder may be secured by adjusting the piston longitudinally upon the piston rod 74.

It is to be noted that the entire motor, operating lever, and dash-pot mechanism are supported by the brake arms. This entire group of elements may be removed by simply removing the two pins 58 and 63. The dash-pot alone may be removed by removing the pins which connect it with the extension 57 and the lever 62.

Attention is called to the dash-pot mechanism. As the motion of the piston is always away from the bottom of the cylinder during the application of the brakes, the piston can never "bottom" in the cylinder. It should be noted in particular that wear of the brake linings tends to move the piston farther from the bottom of the cylinder during the application of the brakes.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A brake comprising; a rotatable drum; a pair of brake shoes for frictionally engaging said drum; an operating member for each shoe; a motor having a frame and a rotative element, said motor frame being pivotally supported by said operating members; and means driven by said rotative element for causing movement of said operating members to move said shoes with respect to said drum.

2. A brake comprising; a rotatable drum; a pair of brake shoes for frictionally engaging said drum; an operating member for each shoe; motive means having a frame, said frame being pivoted at one point to one of said operating members; an arcuate rack pivoted on said frame and pivotally connected with the other operating member; and a pinion meshing with said rack and driven by said motive means to cause movement of said rack about its pivot upon actuation of said motive means, said pivotal movement of said rack causing movement of said operating members to move said shoes with respect to said drum.

3. A brake comprising; a rotatable drum; a pair of brake shoes for frictionally engaging said drum; an operating member for each shoe; a motor having a frame and a rotative element, said frame being pivoted at one point to one of said operating members; an arcuate rack pivoted on said frame and pivotally connected to the other operating member; and a pinion meshing with said rack and driven by said rotative element to cause movement of said rack about its pivot on the motor frame, said pivotal movement of said rack causing movement of said operating members to move said shoes with respect to said drum.

4. A brake comprising; a rotatable drum; a pair of pivoted brake arms; a brake shoe carried by each of said arms for cooperating with said drum; means for yieldingly maintaining said arms in position with the shoes in engagement with said drum; a motor having a frame and a rotative element, said motor frame being pivoted at one point to one of said brake arms; a lever of the first class pivoted to said motor frame at another point, one arm of said lever being pivotally connected to the other of said brake arms; an arcuate rack on the other arm of said lever; and a pinion meshing with said rack and driven by said rotative element to cause movement of said lever about its pivot, said pivotal movement of said lever causing movement of said brake arms to release said shoes from said drum against the force of said yielding means.

5. A brake comprising; a rotatable drum; a pair of pivoted brake arms; a brake shoe carried by each of said arms for cooperating with said drum; resilient means tending to maintain said arms in position with the shoes in engagement with said drum; a motor having a frame and a rotative shaft, said motor frame being pivoted at one point to one of said brake arms; a lever of the first class pivoted to said motor frame at another point, one arm of said lever being pivotally connected to the other of said brake arms; an arcuate rack on the other arm of said lever; and a pinion secured to said motor shaft and meshing with said rack to cause movement of said lever about its pivot upon rotative motion of the shaft in a certain direction, said pivotal movement of said lever causing movement of said brake arms to release said shoes from said drum against the force of said resilient means.

6. A brake comprising; a rotatable drum; a pair of pivoted brake arms; a brake shoe carried by each of said arms for cooperating with said drum; a pair of actuating springs, one for each of said arms, said springs tending to maintain said arms in position with the shoes in engagement with said drum; a motor having a frame and a rotative shaft, said motor frame being pivoted at one point to one of said brake arms; mechanism forming a lever of the first class pivoted to said motor frame at another point, one arm of said lever being pivotally connected to the other of said brake arms; an arcuate rack formed on the other arm of said lever; and a pinion secured to said motor shaft and meshing with said rack to cause movement of said lever about its pivot upon rotative motion of the shaft in a certain direction, said pivotal movement of said lever causing movement of said brake arms to release said shoes from said drum against the force of the actuating springs.

7. A brake comprising; a rotatable drum; a pair of brake shoes for frictional application to said drum; an operating member for each shoe; means for causing said members to apply the shoes to said drum; means for causing said members to release the shoes from said drum; and a dash-pot having a cylinder operatively connected to one of said members and a piston operatively connected to the other of said members so that relative movement of said cylinder and piston is effected by said members, to create a partial vacuum for retarding said shoes during their application, and to permit a substantially unretarded motion of said shoes during their release.

8. A brake comprising; a rotatable drum; a pair of brake shoes for frictional application to said drum; an operating lever for each shoe; means for causing said levers to apply the shoes to said drum; means for causing said levers to release the shoes from said drum; and a dash-pot having a cylinder and a piston, said cylinder being supported by one of said levers and said piston being supported by the other of said levers for causing said piston to move in said cylinder upon movement of the levers, said piston creating a partial vacuum as it moves in one direction for retarding the shoes during their application, and moving freely in the other direction for permitting a quick release of the shoes.

In testimony whereof, I have signed my name to this specification.

GEORGE W. LAUTRUP.